United States Patent
Cates

[11] 3,923,935
[45] Dec. 2, 1975

[54] PARALLEL AIR PATH WET-DRY WATER COOLING TOWER

[75] Inventor: Robert E. Cates, Shawnee Mission, Kans.

[73] Assignee: The Marley Company, Mission, Kans.

[22] Filed: Jan. 25, 1971

[21] Appl. No.: 109,489

[52] U.S. Cl. ... 261/159; 261/DIG. 77; 261/DIG. 11; 165/111; 60/96; 62/305
[51] Int. Cl.² ............................................ B01F 3/04
[58] Field of Search............... 60/95 R, 96; 165/111; 261/DIG. 11, 109, 111, 141, 150, 151–157, 158, 159, DIG. 77; 62/305

[56] References Cited
UNITED STATES PATENTS

| 978,986 | 12/1910 | Burhorn | 261/DIG. 11 |
|---|---|---|---|
| 2,010,980 | 8/1935 | Coulson | 261/DIG. 11 |
| 2,056,263 | 10/1936 | Ehrlich | 165/111 |
| 3,052,105 | 9/1962 | Bowman et al. | 261/156 |
| 3,230,055 | 1/1966 | Wolfrom | 261/156 |
| 3,635,042 | 1/1972 | Spangemacher | 261/150 |
| 3,846,519 | 11/1974 | Spangemacher | 261/109 |

FOREIGN PATENTS OR APPLICATIONS

| 567,196 | 12/1932 | Germany | 261/DIG. 11 |
|---|---|---|---|
| 525,702 | 2/1939 | United Kingdom | 261/DIG. 11 |
| 629,368 | 9/1949 | United Kingdom | 261/DIG. 11 |
| 809,906 | 3/1959 | United Kingdom | 261/DIG. 11 |
| 1,221,038 | 5/1960 | France | 261/DIG. 11 |

*Primary Examiner*—Tim R. Miles
*Attorney, Agent, or Firm*—Schmidt, Johnson, Hovey & Williams

[57] ABSTRACT

A parallel air path wet-dry water cooling tower usable in one form for fog abatement and in another form as a dry cooling tower helper where makeup water resources are limited. In both instances though, hot water to be cooled is first directed to finned tube heat exchange structure where air from the ambient atmosphere moving along one path is brought into indirect heat exchange with the hot water to effect partial cooling thereof. The partially cooled water is then directed to evaporative and thus wet heat exchange structure to further cool the water by bringing the latter into direct contacting relationship with a second airstream from the ambient atmosphere moving along a second path. The dry and wet airstreams emanating from the dry and wet heat exchangers respectively are combined prior to return thereof to the atmosphere. Dampers may be provided in association with one or the other or both of the heat exchange structures to permit selective variation of air flowing along said paths thereof through the heat exchange structures. The relative sizes of the dry and wet heat exchange structures are correlated for most efficient operation to meet a particular fog abatement or water conservation requirement.

2 Claims, 21 Drawing Figures

INVENTOR.
Robert E. Cates

BY
Schmidt, Johnson, Hovey & Williams
ATTORNEYS.

INVENTOR.
Robert E. Cates
BY Schmidt, Johnson,
Hovey & Williams
ATTORNEYS.

INVENTOR.
Robert E. Cates
BY Schmidt, Johnson,
Hovey & Williams
ATTORNEYS.

PARALLEL AIR PATH WET-DRY WATER COOLING TOWER

This invention relates to the field of water cooling towers and especially to an improved tower and method wherein the water to be cooled is first partially cooled through indirect heat exchange with ambient air and then further cooled by evaporative, direct contact with another ambient airstream. In one form of the apparatus the relative size of the wet and dry sections of the tower may be effectively correlated to assure discharge of moist air from the tower which, in mixture with ambient air and at the temperature thereof, results in a combination having a relative humidity below the saturation curve of such mixture so that little if any fog may be observed as a result of discharge of the heated moist air into the atmosphere.

Alternatively, another form of the apparatus permits design of a basically dry water cooling unit wherein the finned tube heat exchange section thereof may actually be undersized insofar as its ability to handle the maximum heat load on the tower on the hottest day for which the unit is designed, by the expedient of including a much smaller evaporative heat exchanger in series water receiving relationship to the dry heat exchange section so that the hottest design day load may be handled using a much less expensive tower than a completely dry unit and without sacrifice in operating efficiency or excessive demand for water makeup.

Water cooling towers for the most part fall into two distinct categories. The most efficient type involves separation of the water to be cooled into droplets or thin sheets so that ambient air may be moved through dispersed water to effect evaporative cooling thereof. Generally, in equipment of this type, water to be cooled is delivered to a hot water distribution basin or spray system and allowed to gravitate downwardly through an underlying fill assembly so that air from the ambient atmosphere which is moved through the fill, either in crossflow or counterflow relationship to the path of gravitation of the water, is brought into direct contacting relationship with the droplets of water or thin sheets thereof. Very efficient cooling of the water takes place primarily by evaporative effect but also by sensible heat exchange. Evaporative type cooling towers are in wide commercial use but sometimes must be positioned where the fog emanating from such towers on cold days presents a dangerous or noxious problem by virtue of condensation of moisture from the fog on surrounding structures, such as bridges or buildings. The capability of providing an evaporative type water cooling tower which does not suffer from the problem of periodically exhibiting visible plume or fog condition under all climatic uses of the equipment has definite advantages over presently available water cooling tower apparatus in that a tower of these characteristics could be used in many locations not now feasible for present designs, not only from the psychological standpoint of elimination of the visible fog plume but the physical problems associated therewith as well.

The answer to evaporative type cooling tower visible fog or plume abatement is not to simply substitute a dry water cooling tower for an evaporative type tower since finned tube heat exchangers for bringing the water to be cooled into indirect heat exchange with air from the ambient atmosphere are inherently much more expensive than evaporative type cooling apparatus. It has not heretofore been practical to use dry cooling towers in applications where high water loads must be handled and efficiently cooled. Thus at the present time, completely dry water cooling tower systems are used only for small systems, in areas where water is either very expensive or not available in the quantities required for the makeup of a conventional evaporative type cooling tower unit when large volumes of water must be cooled. For example, in many areas the water supply falls sharply in winter months or periods of recurring drought thus making it impractical to rely on local supply for makeup water. In many applications for example, tens of thousands of gallons of water must be provided per minute to replace that which is lost by evaporation.

It is, therefore, an important object of the present invention to provide a water cooling tower and method wherein the principle of directing the water to be cooled through a dry heat exchanger and then a wet heat exchanger in serial order with separate airstreams being passed through the heat exchange structures is equally applicable to construction of a visible plume or fog-free cooling tower in one instance, or to fabrication of a tower embodying a dry heat exchanger as the major heat exchange section but also provided with a small evaporative exchanger serving as a trimmer so that a tower of practical size and cost for its cooling capability may be provided utilizing only a minimum amount of makeup water in those cases where water supply resources are limited.

Another object of the invention is to provide a water cooling tower and method wherein the water to be cooled is passed in serial order through a dry, indirect heat exchange section and then a wet direct, evaporative section with separate airstreams being passed through the heat exchange sections, thus permitting the tower to be positioned in virtually any desired location without significant regard to the nature of the surroundings since all visible fog resulting from discharge of the hot airstreams back into the surrounding atmosphere may be eliminated or drastically reduced by the simple expedient of correlating the relative sizes of the dry and wet heat exchange sections to always maintain the relative humidity of tower air and moisture discharge to a level below the saturation point thereof when mixed with ambient air at the temperature of the latter.

A still further important object of the invention is to provide parallel air path wet-dry water cooling tower apparatus wherein selectively adjustable dampers may be provided in association with the wet or dry heat exchange sections of the tower, or both so that the flow of air through respective heat exchange structures may be varied at will to: increase the heat transfer capacity of the complete tower seasonally, or during periods of high dry bulb-low wet bulb temperatures and permitting use of a smaller sized and lower cost tower for a particular job than an undampered tower; increase the visible plume abatement capability of the tower during periods of extreme low ambient temperature conditions and coincident high heat loads; and minimize water consumption in the evaporative heat exchange section when that section is not required to handle the heat load, or only partial effectiveness is needed; and to contain heat in the tower for prevention of freeze-up under extremely cold temperature conditions.

A further important object of the invention is to provide a parallel air path wet-dry cooling tower of the characteristics described above which may be embodied in a number of cooling tower designs with equally effective results; as for example in a single or double crossflow tower or a counterflow unit, all of which use fans to pull in air from the ambient atmosphere and move such air through the heat exchange sections, in a natural draft hyperbolic cooling tower where air movement through the heat exchange structures is induced by the chimney effect of the hyperbolic stack, and other similar tower applications, whether constructed of wood, metal, concrete or equivalent materials presently in use in the cooling tower field.

When the coil is arranged in an upright position, it is an important object of the invention to provide water cooling apparatus wherein the water to be cooled is first directed to such upright finned tube heat exchange structure of the parallel air path wet-dry tower so that the siphon effect of the water gravitating downwardly toward the evaporative heat exchange structure underlying the finned tube exchanger overcomes some of the pumping losses inherent in delivering the water to be cooled to the top of the first heat exchanger. In this connection, a corollary to the preceding object is the fact that the use of upright finned tube heat exchange structure for effecting indirect heat exchange of the hot water with an airstream passing therethrough and which is positioned to deliver the hot water passing therethrough to the underlying evaporative heat exchange structure permits the finned tube exchanger to be operated with only one header located at the upper ends of the exchanger tubes for economy, free flow of liquid through the tubes into the distributor of the evaporative heat exchange structure therebelow, simplicity of draining the tubes for shutdown with the required venting function being provided through the tubes from below, and even maintenance of the tubes in operation if desired.

In its preferred forms, the improved cooling tower apparatus has two uses: visible fog or plume abatement; and dry tower trimming. In the case of visible fog abatement, a typical mechanical or natural draft water cooling tower evaporates large quantities of water from the hot water to be cooled which gravitates through the fill of the tower. This moisture is incorporated into the airstream discharged from the top of the tower, either by the chimney effect of a natural draft, hyperbolic tower, or the fan of an induced or forced draft cooling tower. During many climatical conditions the appearance of cooling tower induced fog can be seen above the fan cylinders or stack of the tower. Fog may occur at any time of year providing the two air masses which mix (i.e., the air mass leaving the top of the tower and the air mass of the surrounding ambient atmosphere) are at a temperature-humidity relationship which sustains fog. A relatively easy visible plume abatement problem is one which has a falling heat load during colder weather. A difficult fog abatement application may be defined as one which heavily loads the exiting airstream with heat and moisture on a year-round basis regardless of ambient temperature conditions. A typical cooling tower application with a heavy heat load is one which must handle high water temperatures relative to the entering air wet-bulb temperature. Heretofore, the elimination or minimization of this fog has been considered to be an impractical and unobtainable goal. The required amount of heat which must be added to the exiting airstream has always been considered as being required to be supplied by a separate source such as separate steam coils, or a gas burner or the like, wherein the additional heat has further waste. In the case of generating stations where fuel waste is energy lost, plume abatement in this fashion found little acceptance.

In the present parallel air path (meaning hydraulically parallel as opposed to geometrically parallel) wet-dry cooling tower apparatus, the existing waste heat stream which is conventionally directed to the cooling tower, is actually used to a beneficial extent as the source of energy and means for producing the heated dry air mass which is comingled with saturated air discharged from the evaporative heat exchange structure of the apparatus. Of primary significance in this respect though is the fact that such comingling occurs within the confines of the cooling tower casing and prior to discharge of the mixture to the ambient atmosphere. The air-water mixture exiting from the tower is then well below saturation. This exiting air, relatively dry by cooling tower standards, can then be found to produce a desirable ambient air mixing condition above the tower discharge which precludes formation of fog in the form of a visible plume.

In the case of a wet-dry cooling tower embodying the principles of this invention and which is specifically designed for use in an application where there is a falling heat load during colder weather, the dry finned tube heat exchange structure should be sized as small as practical to minimize the cost of the tower. However, a tower designed for a more difficult situation of a continuous heavy heat load regardless of ambient temperature conditions, requires that the dry finned tube exchanger be sized considerably larger in order to minimize the fog which will tend to occur during extremely cold weather conditions.

To an equally important extent, the parallel air path wet-dry tower and method has utility as a dry cooling tower trimmer or helper which may be activated during periods of the year when the dry-bulb temperature is at an extremely high level accompanied by relatively low wet-bulb temperatures. Generally, completely dry cooling tower systems are only considered applicable in areas where water is either very expensive or not available in quantities required for the makeup of a conventional evaporative type cooling tower. As a consequence, the availability of a wet-dry cooling tower having the property of being operable under varying climatic conditions, available at a reasonable construction and operating expense, and requiring only limited water makeup, permits a potential user to plan his plant for most efficient operation and location without giving primary attention to the proximity of adequate makeup water supplies. For example, a power plant site having minimum water availability can be extended considerably beyond its normal anticipated generating capacity where water is a factor by operating the wet portion of the wet-dry tower only during periods of the year when high dry-bulb temperatures are encountered. As a result, it is possible to construct a large power plant on a site that could not otherwise be considered because of the limited water quantities available for a conventional wet cooling tower system requiring significant quantities of makeup water on a continuous basis. In certain instances, the generating station may be positioned closer to the load center than would otherwise be possible, or located in proximity to a fuel supply even though water shortage would be a negative factor if it were not for the use of the wet-dry cooling tower hereof.

When the parallel air path wet-dry cooling wet-dry cooling tower of this invention is used as a helper or trimmer system, the dry finned tube exchanger section is proportioned much larger than the wet exchanger section. Preferably, the wet section is sized to accommodate the design temperature conditions at the peak dry-bulb and coincident wet-bulb likely to be encountered in that geographical area during normal summer weather. Because of the relatively high cost of the dry exchanger section as a part of the entire cooling tower unit, the trimmer or helper design necessarily has primary application in those instances where water consumption must be minimized.

Figure 1:
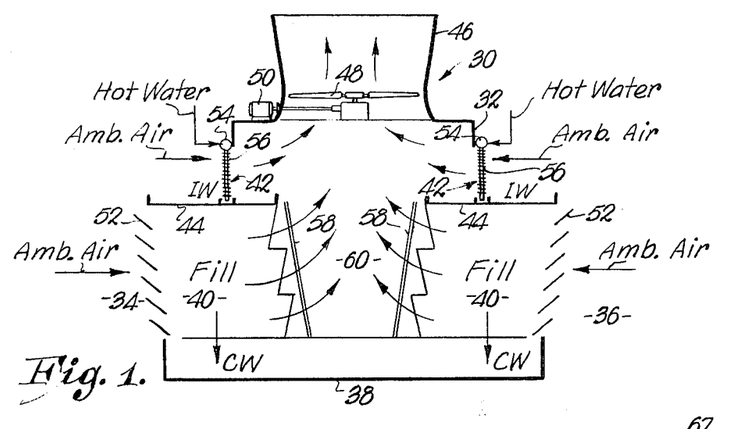
FIG. 1 is an essentially schematic, cross-sectional representation of a parallel air path wet-dry induced draft water cooling tower embodying the concepts of the present invention and having utility for eliminating or minimizing the visible plume which would otherwise be discharged from the tower in the absence of the dry, indirect heat exchange structure cooperable with the evaporative heat exchange structure of the tower for cooling hot water as it is passed through the two heat exchange structures in serial order.
Figure 21:
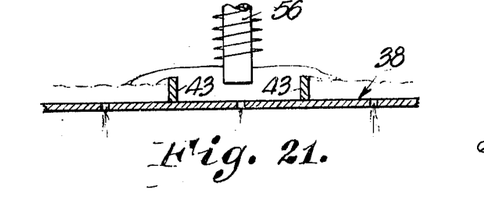
FIG. 21 is a fragmentary, enlarged schematic, cross-sectional showing of a preferred position of the discharge ends of the finned tube dry heat exchanger of the cooling tower and illustrating the way in which weirs are provided on opposite sides of the discharge ends of the finned tubes to cause partially cooled water delivered into the intermediate water basin below each dry heat exchanger to be maintained at an effective level to submerge the tube ends and maintain a venting air seal therearound.

The crossflow water cooling tower broadly designated 30 in FIG. 1 is provided with a casing 32 having air inlets 34 and 36 at opposite sides thereof. Cold water basin 38 underlies casing 32 and is adapted to receive water from the evaporative heat exchange structure 40 adjacent each inlet 34 and 36 of casing 32. The dry finned tube heat exchange structure 42 overlying each fill structure 40 is adapted to deliver partially cooled water into a corresponding open top horizontal intermediate water distribution basin 44 above each fill 40. As is best shown in FIG. 21, two upright weir defining members 43 are carried by the floor of each basin 38 on opposite sides of the lower discharge ends of corresponding dry heat exchange structures 42. The members 43 cause water to be maintained therebetween at a height such that the lower ends of each set of finned tubes 56 are maintained submerged in the water so that a venting air seal is maintained around the tube extremities. Casing 32 has one or more fan cylinders 46 in the upper part thereof which house respective induced draft fans 48, each driven by a corresponding motor 50.

A series of elongated, transversely inclined, vertically stacked inlet louvers 52 carried by casing 32 in partially covering relationship to respective inlet openings 34 and 36 are disposed in an inclined row following the contour of adjacent faces of fills 40 and serve to prevent splash-out of water and to contain such water in corresponding fill structures 40 without significantly interfering with entry of air from the atmosphere into the interior of casing 32.

Although not illustrated in detail in FIG. 1, it is understood that the evaporative heat exchange structure 40 designated in the drawing as "fill" is of conventional nature and for example, may comprise a series of horizontally and vertically spaced, generally horizontally disposed slats carried by a suitable corrosion resistant supporting grid so that water gravitating from a plurality of openings in the bottom of distribution basin 44 contacts the slats and is broken up, forms films of water thereover, and drips from the bottom of each slat to cause the air entering respective fills 40 to come into contact with water of maximum surface area for most efficient cooling thereof prior to gravitation of the water into collection basin 38. Although the fill construction described above is conventional for a crossflow type tower is illustrated in FIG. 1, it is to be understood that other equivalent fill structures may be used with equal facility in the present invention without departing from the principles thereof.

Figure 2:
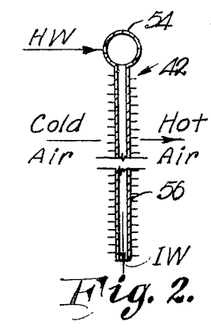
FIG. 2 is a schematic cross-sectional representation of a single pass finned tube exchanger usable in a preferred form of the cooling tower illustrated in FIG. 1 and illustrating the normal flow paths of the hot water and the airstream passed therethrough.
Figure 3:
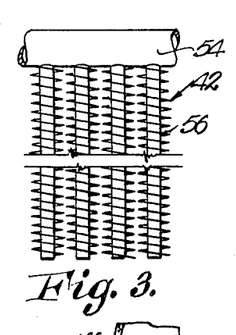
FIG. 3 is a fragmentary elevational view of the finned tube heat exchanger shown in FIG. 2.

With reference to FIGS. 2 and 3, the preferred single-pass dry heat exchange structure 42 includes a horizontal header 54 adapted to be coupled to a hot water supply line and having a series of finned tubes 56 depending therefrom and lying in a vertical plane extending transversely of respective inlet openings 34 and 36 of casing 32. Each of the finned tubes 56 is open at the lower end thereof and is positioned in direct overlying relationship to a corresponding hot water distribution basin 44 for delivering partially cooled water (indicated as IW or intermediate water in the drawing) into a corresponding distributor. Although not so depicted in the schematic illustrations of FIGS. 2 and 3, it is to be appreciated that header 54 may be of somewhat triangular configuration longitudinally thereof with the upper apex of the triangle being located intermediate the ends of the header so that uniform flow of water to all of the tubes 56 is obtained. Uniform distribution is best accomplished by delivery of the hot water from the supply source to the central part of the header 54, or alternatively to a number of points along the length of such header.

In operation, hot water, which for example may be derived from a condenser forming a part of a power plant or the like, is directed to each of the headers 54 whereupon such water flows along the length of each header and gravitates downwardly through respective finned tubes 56 for ultimate discharge into corresponding intermediate water distribution basins 44.

Although during normal operation of the tower, the ends of tubes 56 are beneath the level of water confined between weir defining members 43 to provide an air seal therearound, it is to be understood that this seal is not maintained during momentary start-up and shut-down, or drain periods of operation. Tube submergence is required to prevent undesired air venting during normal operation, which otherwise could vent air through the tube end to the header 54 and prevent the development of a siphon hydraulic loop — a necessary condition for economic operation and for proper water distribution within header 54.

It is to be understood that fan 48 is operating at a speed to cause air from the ambient atmosphere to be drawn through the passages between finned tubes 56 of each heat exchange structure 42 at a preferred rate to partially cool the water gravitating downwardly in corresponding heat exchange tubes, to a predetermined intermediate temperature level. As a result, the cool air from the ambient atmosphere is brought into indirect heat exchange with the hot water flowing downwardly from respective headers 54 toward an underlying water distribution basin 44. The path of flow of air from the ambient atmosphere through the single path heat exchange structure 42 at each side of the cooling tower 30 is indicated schematically by the arrows in FIG. 1.

At the same time, air is being drawn through fill 40 at each side of tower 30 so as to bring such air into direct contacting relationship to water gravitating downwardly through the fill from distribution basin 44 thereabove. The partially cooled intermediate water delivered to each fill 40 is further cooled therein by evaporative as well as sensible heat exchange so that the water which is received in collection basin 38 is at a desired low level temperature for return to the point of use such as the power plant condenser. Conventional entrained water eliminators 58 are provided adjacent the air outlet faces of fill structures 40 to remove droplets of water from the air directed to central plenum chamber 60 of casing 32 from corresponding evaporative heat exchange structures 40. However, it is to be appreciated that the air emanating from fill units 40 is of very high relative humidity with the water in the air being readily condensable to liquid form upon lowering of the temperature of such air.

However, by virtue of the fact that the moisture laden air collected in plenum chamber 60 is intimately combined and admixed with the dry air emanating from finned tube heat exchange structures 42, the air and moisture mixture actually discharged vertically from tower 30 via the cylinder 46 is at a much lower relative humidity than would be the case if the moisture laden air from fill assemblies 40 was simply discharged to the atmosphere without incorporation of dry air therewith.

It is to be recognized though that the heat exchange structures 42 and 40 must be appropriately sized relatively to assure discharge into the atmosphere of an airstream which has a relative humidity sufficiently low that no condensation thereof occurs to produce a visible plume at the temperature to which such stream is lowered by virtue of mixing thereof with the ambient atmosphere.

Figure 20:
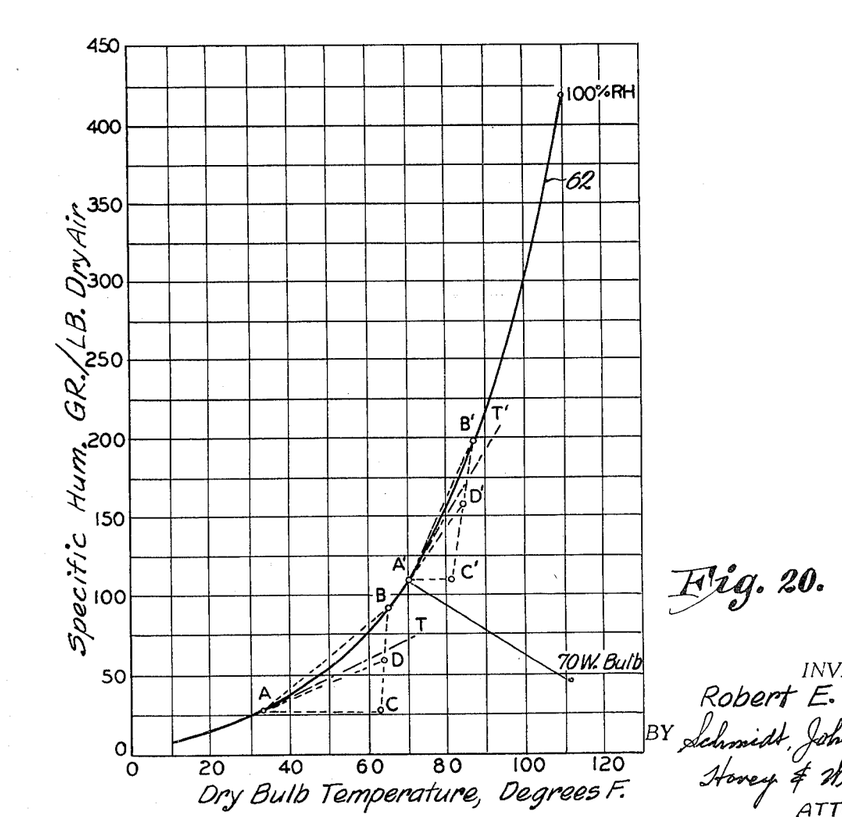
FIG. 20 is a psychrometric chart containing graphical representations of the way in which the parallel air path wet-dry water cooling tower structure of this invention may be used to prevent or minimize the visible fog plume emanating from the discharge stack of a crossflow or counterflow type cooling tower during summer as well as winter operation.

Sizing of heat exchange structures 40 and 42 to eliminate or minimize visible fog emanating from tower 30, is greatly assisted by reference to a psychrometric chart of the type illustrated in FIG. 20. In explaining the psychrometrics involved in mechanical or natural draft plume abatement, it is first important to take into account the fact that the chart illustrated is essentially an X-Y coordinate system in which the coordinates are linear expressions of specific humidity in grains of water per pound of dry air as compared with the dry-bulb temperature in degrees Fahrenheit. Curve 62 represents the 100% relative humidity line or saturation curve. The area above curve 62 may be classified as the supersaturation area and air masses which lie in the area above such curve must be in a state of fog. Air masses which lie below the 100% saturation curve are in general not in a state of fog. Many cooling towers do not generate fog during the drier inlet air conditions normally encountered during the summer. It is only during conditions of high ambient relative humidity or actual 100% saturation, or lower relative humidity combined with colder ambient temperature that the visible fog plume is generated. As previously indicated, the most difficult plume abatement conditions exist when the heat load is high and the air entering the cooling tower is cold and/or substantially at or adjacent to the saturation curve 62. For purposes of explaining the operation of cooling tower 30 having a wet-dry water cooling system, a most difficult ambient condition will be assumed wherein the air entering cooling tower through inlet openings 34 and 36 is actually at the saturation point on curve 62.

Thus, if it is assumed that air entering the cooling tower under wintertime ambient conditions is at position A on the psychrometric chart of FIG. 20, the air is then at a 100% relative humidity condition, 33° F. wet bulb. If the air was heated in a conventional, entirely wet evaporative type cooling tower, the air discharged from the tower through the fan cylinder or stack thereof would typically be at a point designated as B. A straight line drawn between points A and B represents the mix line for these two masses of air. It can be recognized that mixing of air discharged from the cooling tower with ambient air occurs immediately above the fan cylinder or stack of the cooling tower. In general, the mixing of any two air masses located anywhere on a psychrometric chart will occur on a straight line between the points which define the two air masses. The actual point on the mix line, at which equilibrium finally exists, is defined by the relative mass flow rates of the two airstreams. In essence, it can be said though that the mix line A-B will produce fog since the mix line is entirely above the saturation curve 62 and the equilibrium state of the air mass will continually be above saturation.

If it is further presumed that a dry heating process is applied to a mass of air which is initially at point A, the exit temperature conditions for this mass of air leaving the cooling tower may typically be at a point C. (Adding heat without adding moisture indicates the exiting air mass is at a point of higher dry-bulb temperature and constant moisture content). Apparatus 30 as described above has the inherent ability to mix together two parallel path airstreams within the cooling tower. The condition of the air leaving fill assemblies 40 can be assumed to be at a point such as B while the condition of the air leaving the path through dry heat exchange structures 42 can also be at a point represented for example by C. Accordingly, the mixing process within the plenum chamber 60 of casing 32 indicates a condition of combined dry and moist air which would leave the cooling tower 30, to be somewhere between points B and C, on a straight mix line, and in the example case the air would well be at a point represented by D. Therefore, the condition of the air which exits from cooling tower 30 may be defined as at point D. This air must then mix with the surrounding ambient air which has earlier been defined as at point A. The straight line drawn between point A and point D will then indicate a mix line which does not cross the saturation curve 62 and which does not produce fog. As a consequence, by designing the relative sizes of the heat exchangers 42 and 40 of cooling tower 30 of such nature that point D produced thereby is always below the tangent line T to saturation line 62, the cooling tower will not produce visible fog under all conditions of operation thereof. As point D moves above the tangent line T there willl be a tendency for whispy vapor plume feathers to be produced under extreme temperature conditions. Accordingly, the matter of sizing heat exchange structures 40 and 42 for a particular application will necessarily be governed by the cost of the respective components as compared with the necessity of providing a completely visible plume free cooling tower unit. This is for the reason that as point D approaches point C the cost of the apparatus increases. Conversely, as point D approaches point B the cost of the apparatus approaches the cost of a conventional evaporative type cooling tower.

Projecting the same apparatus as described above with respect to wintertime operation into a summertime condition, it can be seen that the plume generation condition that will exist during a 70° F. dry-bulb 100% relative humidity entering air condition may be represented in the same way as previously described. The "prime" notation for the letter symbols used in the upper representation of the psychrometric chart illustrated in FIG. 20 is used for summertime fog conditions. Comparing the two summer-winter conditions, it can be observed that the summertime plume condition is more easily overcome than in winter by comparing the proximity of point D and D' to the tangent lines T and T' respectively. In other words, if the plume abatement apparatus is sized to stay below the wintertime plume condition tangent line, the same tower will satisfy the summertime conditions more easily, if all other factors remain relatively constant. It is especially significant to note that the rise in initial temperature difference, that is the difference in temperature between the entering hot water and the entering ambient air dry-bulb temperature, for the sensible indirect heating portion of the system is much greater in the wintertime than in the summer. This principle is especially helpful in overcoming the more difficult wintertime plume abatement condition.

Other important features of cooling tower 30 include the fact that delivery of the hot water to header 54 of each dry heat exchange structure 42 for gravitational flow downwardly through corresponding finned tubes 56 produces a siphon effect which minimizes the power requirements for delivering hot water from the source thereof to distribution headers 54. In addition, the elimination of headers at the bottom of tubes 56 renders the heat exchange structure more economical, allows quick draining of the system when required and permits maintenance on the tubes while they are in operation if necessary.

Figure 4:
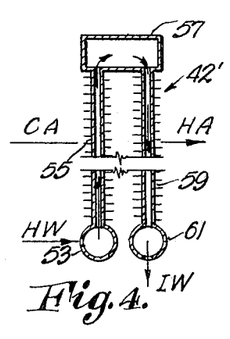
FIG. 4 is a schematic, cross-sectional representation of a two-pass finned tube heat exchanger utilizable in the tower of FIG. 1 in lieu of the single-pass finned tube exchanger shown therein, (with the flow paths of the water and the airstream being indicated by suitable arrows) and wherein the airflow is in the same direction as liquid flow from one bank of exchanger tubes to the next and thereby in parallelism therewith.
Figure 5:
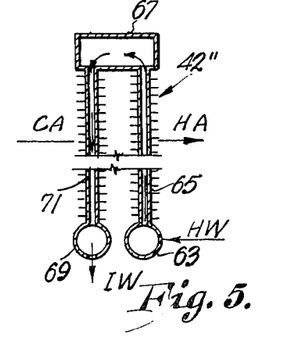
FIG. 5 is a schematic representation of a two-pass finned tube heat exchanger utilizable in the tower of FIG. 1, with the flow of liquid from one pass to the other being counter to the direction of airflow.

Although the single-pass heat exchange structure 42 illustrated in FIG. 2 and used in the cooling tower of FIG. 1 is preferred, two-pass dry exchangers as shown in FIGS. 4 and 5 may be used if desired, particularly in those circumstances where it is necessary to limit the minimum allowable water velocity within the finned tubes of the dry exchanger. In the case of the two-pass parallel flow heat exchanger 42' of FIG. 4, the general flow direction of the water and the general flow direction of the air are in the same direction, thereby resulting in a parallel flow path whereas in the two-pass counterflow heat exchanger 42" of FIG. 5, the general flow direction of the water and the general flow direction of the air are in opposite directions thus resulting in counterflow paths. In addition, it is to be understood with respect to the schematic showings of FIGS. 2, 4 and 5 that single rows of tubes have been illustrated for simplicity, but in fact multiple rows of tubes in the direction of airflow may be used for optimum economy and heat exchange.

In parallel path exchanger 42', hot water is directed to inlet header 53, flows upwardly through the upright finned tubes 55 and is collected and redistributed in common header 57 thereabove. The partially cooled water collected in header 57 is directed to upright finned tubes 59 for gravitation therethrough to the header 61 connected to the lower ends thereof.

A similar arrangement is depicted in FIG. 5 except that the inlet hot water header 63 of the counterflow pass heat exchanger is located downstream of the airflow so that water moving upwardly in the upright finned tubes 65, redistributed in header 67 and returned to the intermediate outlet water header 69 via finned tubes 71, is cooled by air which first passes over the coolest water and then the hottest water flowing through the exchanger.

Figures 6, 7, 8:
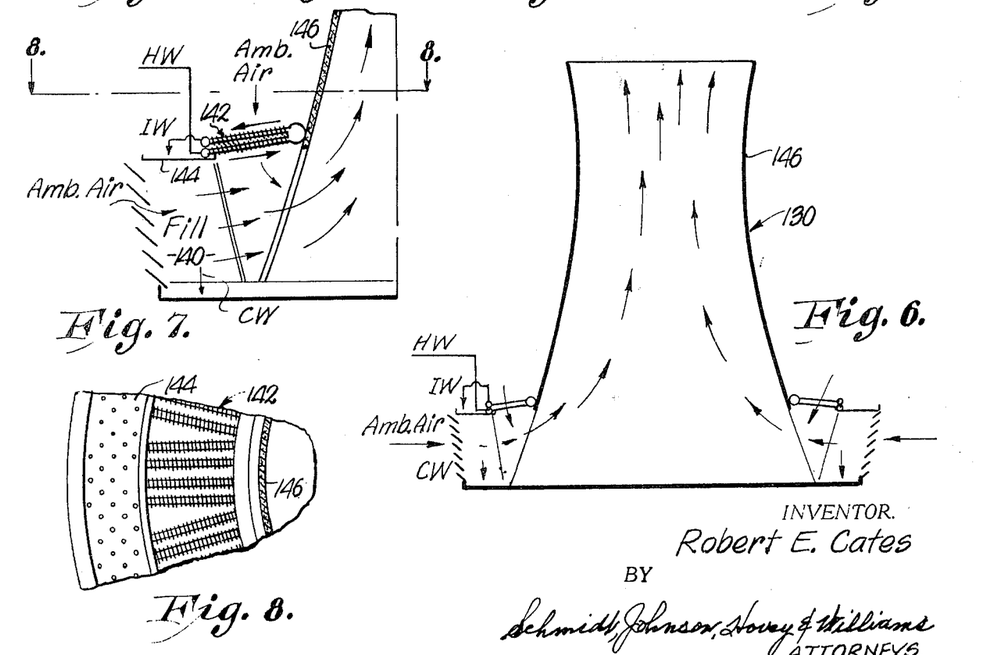
FIG. 6 is a schematic showing of a hyperbolic natural draft cooling tower having parallel air path wet-dry water cooling structure around the perimeter of the base of the hyperbolic stack with the finned tube heat exchanger being of the two-pass, counterflow type.
FIG. 7 is a fragmentary cross-sectional representation of the left-hand portion of the tower illustrated in FIG. 6, and showing in greater detail, the two-pass finned tube heat exchanger and its relationship to the evaporative heat exchange structure of the tower.
FIG. 8 is a fragmentary plan view taken substantially on line 8—8 of FIG. 7 and looking downwardly in the direction of the arrows.

FIGS. 6–8 inclusive illustrate the way in which the parallel air path wet-dry principle of this invention may be used with equal facility in a natural draft hyperbolic cooling tower 130 wherein the dry heat exchange structures 142 are located between the shell 146 of tower 130 and the hot water distribution basin 144 of respective evaporative fill assemblies 140, in an inclined position normally occupied by an annular shroud conventionally used to cover the annular space between the evaporative fill units and the base portion of shell 146. Although a two-pass dry heat exchanger 142 similar to exchanger 42" has been shown in FIGS. 6–8 inclusive as being preferred since the space between shell 146 and distribution basin 144 is somewhat limited, it is to be appreciated that a single-pass dry heat exchanger may also be used, particularly in applications where relatively high water flow rates would otherwise cause extreme tube velocities within the indirect heat exchanger. The operation of tower 130 is identical to that of tower 30 except that in this case the airstreams passing through dry heat exchanger 142 and fill assemblies 140 respectively, are induced by the chimney effect of stack 146 rather than through the medium of a power driven fan. Again it is to be pointed out though that the water flow through the dry heat exchanger is such as to effect delivery of partially cooled intermediate water directly into water distribution basin 144 for gravitation onto the fill assembly 140 located in underlying relationship thereto. The dry air emanating from finned tube heat exchange structure 142 mixed with the moist air from fill assembly 140 in accordance with the psychrometrics of the chart illustrated in FIG. 20 and plume abatement results for the same reasons previously explained.

Figure 9:
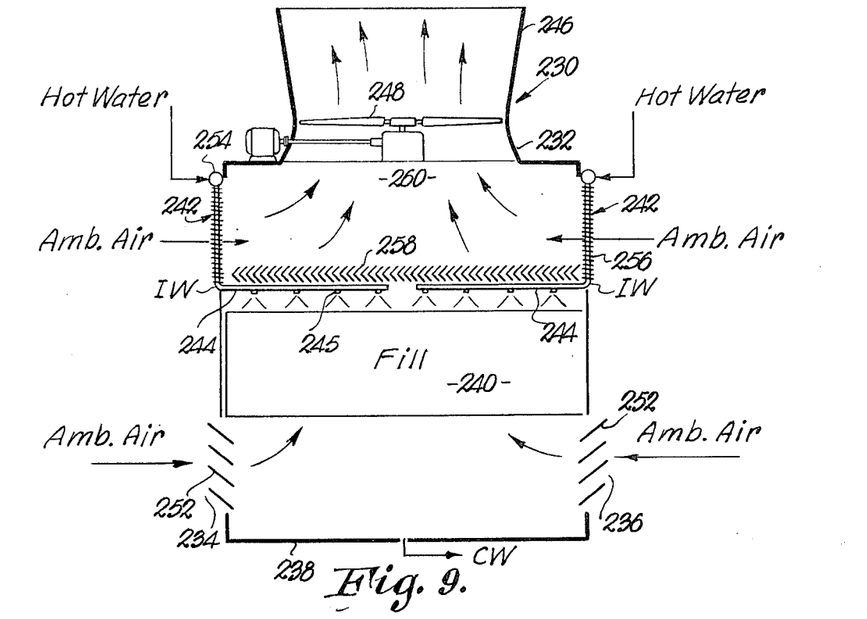
FIG. 9 is a schematic cross-sectional showing of an induced draft, counterflow type water cooling tower embodying a finned tube heat exchange section and a counterflow evaporative fill assembly wherein the hot water to be cooled is passed in serial order through the dry heat exchanger section and then the wet exchanger section.

The counterflow cooling tower 230 shown in FIG. 9 operates in a fashion generally similar to towers 30 and 130 in that hot water to be cooled is delivered to the header 254 of each of the dry heat exchange structures 242 at opposite sides of the casing 232. The hot water gravitating downwardly in respective finned tubes 256 is directed into a series of horizontal distribution headers 244 provided with a series of downwardly projecting spray nozzles 245 which are operable to spray the partially cooled intermediate water onto evaporative fill assembly 240 underlying the spray nozzles. The fill 240 is preferably of the type conventionally used in counterflow cooling towers and which, for example, may comprise a series of horizontal, vertically spaced grids which break up the water gravitating onto the same but do not preclude vertical movement of air through the fill which enters casing 232 via inlet openings 234 and 236 in the base portion of the tower. Water gravitating from fill 240 is received and collected in cold water basin 238. Inlet louvers 252 across each of the inlet openings 234 and 236 prevent splash-out of water without interfering with free-flow of ambient air into the interior of casing 232 while eliminators 258 across the plenum chamber 260 of casing 232 above spray headers 244 and defined in part by casing 232 as well as heat exchange structures 242, serve to remove entrained water from the air as it is moved vertically by fan 248 rotatable in fan cylinder 246 at the upper end of the cooling tower casing.

In operation, ambient air pulled into plenum chamber 260 through heat exchange structures 242 comes into indirect heat exchange with the water flowing downwardly through the finned tubes 256 to partially cool such water. The precooled intermediate water is then sprayed onto fill 240 where ambient air pulled into the interior of casing 232 via inlets 234 and 236 passes in counterflow, direct contacting relationship with the water gravitating through fill 240 to cool the water not only by evaporation but also by sensible heat exchange. Accordingly, the separate airstreams passing through heat exchange structures 242 and 240 respectively comingle in plenum chamber 260 for discharge in combined state to the atmosphere via cylinder 246. As previously explained, by properly correlating the respective sizes of heat exchangers 242 and 240, the moist air discharged to the atmosphere through the overhead cylinder 246 may be maintained at a moisture level such that upon mixing thereof with the ambient atmosphere at the temperature of the ambient air, no visible fog will be produced even at the lowest temperature which the tower is designed to operate without visible plume.

Figure 10:
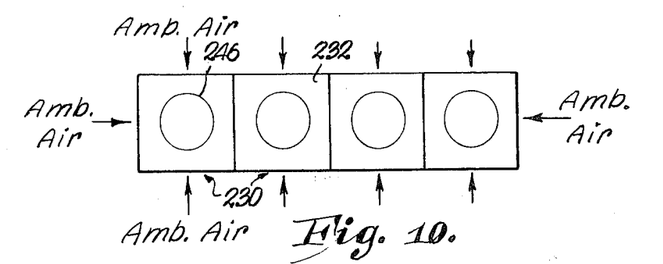
FIG. 10 is a schematic plan view of a typical layout where a plurality of the counterflow towers as illustrated in FIG. 9, are positioned in side-by-side relationship.
Figure 11:
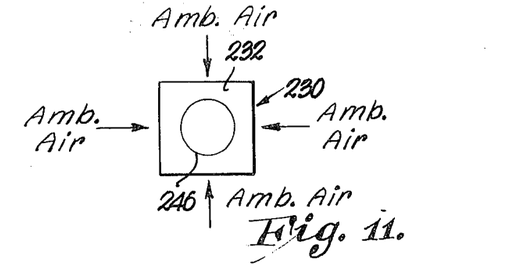
FIG. 11 is a schematic showing similar to FIG. 10 but illustrating the way in which all four sides of a single counterflow tower of the type shown in FIG. 9 may be left open for entry of air around the entire tower.
Figure 12:
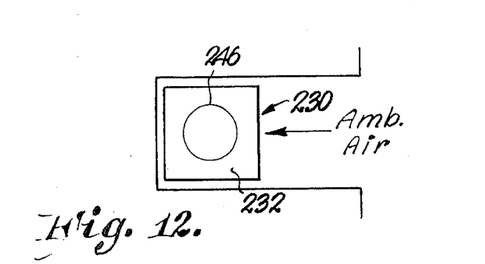
FIG. 12 is a schematic showing of the counterflow tower illustrated in FIG. 9 and indicating the way in which air may be permitted to enter the tower from only one side where space limitations preclude airflow around the entire base portion of the tower casing.

FIGS. 10, 11 and 12 show the way in which counterflow type cooling towers 230 embodying the principles of the present invention may be used either in multiple relationship as indicated in FIG. 10, as a single tower with air being permitted to enter from all sides around the perimeter of the tower as shown in FIG. 11, or in a confined space as indicated in FIG. 12 wherein air may enter the lower part of the tower only through one inlet opening at the base thereof.

In most instances, parallel air path wet-dry cooling tower apparatus as described and having a dry heat exchange section cooperable with an evaporative heat exchanger, can be sized most economically for a particular application by providing damper structure in association with one or the other of the heat exchangers, or both to permit selective control over the separate airstreams passing through the heat exchangers. For example, by utilizing a damper assembly in association with the dry heat exchange structure for shutting off the air which normally passes through the finned tube heat exchanger during periods of the summer when high dry-bulb temperatures are incurred coincident with low wet-bulb temperatures, a smaller cooling tower may be used for a particular application and still meet the design requirements for that particular job. This is for the reason that when high dry-bulb temperatures occur along with low wet-bulb temperatures, visible fog plumes are not normally generated and fog abatement apparatus is not required. By closing off the airflow to the dry finned tube heat exchange structure, the airflow through the evaporative heat exchange portion of the tower is increased causing the total unit to operate at lower water temperatures. In the event a specified water out temperature must be held by the tower, the damper structure thus serves as a device which increases the heat transfer capacity of the tower during high dry-bulb, low wet-bulb temperatures and permits minimization of the total tower size purchased without affecting its ability to meet the design specification. As a consequence, a parallel air path wet-dry water cooling tower having an adjustable damper influencing the airflow to each finned tube heat exchange structure provided on the tower permits utilization of a cooling unit of smaller size and thus of less installed capital cost than a system that does not have a controllable or adjustable damper. This of course presupposes that the cost of an adequate damper system and its attendant controls can be installed on a particular tower at an expense figure less than the cost difference between a dampered and undampered cooling tower.

It is also of significance to note in this respect that the use of a control damper system in association with at least the dry finned tube heat exchange structure of a parallel air path wet-dry cooling tower has greatest potential value in those situations where the most difficult plume condition must be met, because in that case the dry heat exchange structure must be considerably larger in relationship to the evaporative section of the tower than is the situation where an easy or moderate plume abatement problem must be solved. This is for the reason that the more difficult the visible plume problem, the larger the dry exchange section must be to provide adequate dry hot air for mixing with the moist air in the tower to maintain the discharge mixture below the saturation curve 62 as previously explained above.

Figures 14, 15:
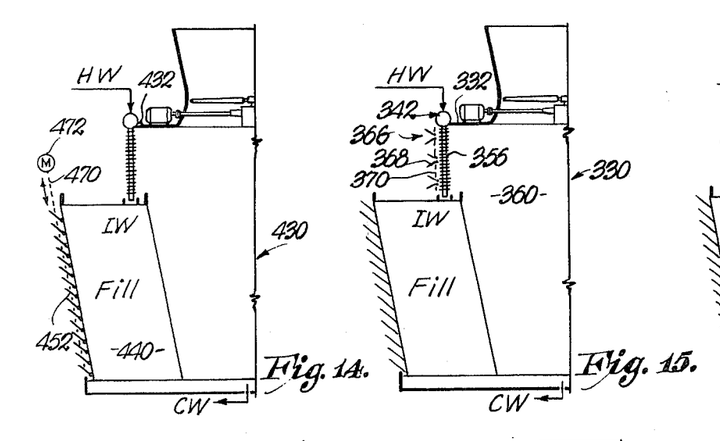
FIG. 14 is a fragmentary, generally schematic showing of a crossflow, induced draft, parallel airflow, wet-dry cooling unit wherein the inlet louvers normally provided adjacent the air inlet face of the wet fill at each side of the tower, are mounted for pivoting movement so that they may be opened and closed as desired under the control of a motor shown schematically coupled thereto, for selective variation of the airflow through the evaporative heat exchanger of the tower.
FIG. 15 is a tower similar to that illustrated in FIG. 14 but in this instance showing adjustable dampers across the inlet face of the dry finned tube heat exchanger of the tower for selectively controlling passage of cooling air across the tubes of the dry exchanger.

One type of control damper system for a parallel air path wet-dry cooling tower embodying the principles of the present invention, is illustrated schematically in FIG. 15 wherein damper structure broadly designated 366 is provided in covering relationship to the outer face of the dry finned tube heat exchange structure 342 forming a part of tower 330. The damper structure is shown in schematic form only and is intended to represent a series of horizontal damper blades 368 interconnected by common control mechanism 370 for simultaneous operation of the blades from the open positions thereof as illustrated, to closed disposition blocking flow of air from the ambient atmosphere into the interior of casing 332 through the finned tubes 356 of respective dry heat exchangers 342.

Figure 16:
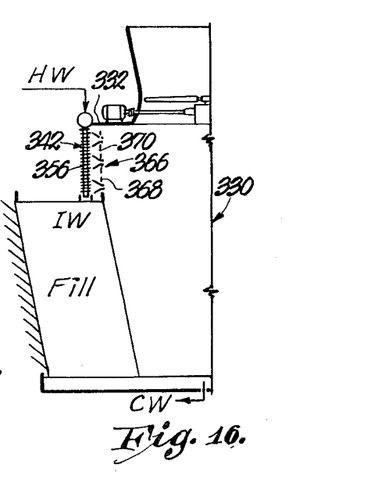
FIG. 16 is a schematic illustration of the same tower shown in FIGS. 14 and 15, but illustrating another position of the control dampers adjacent the air outlet face of the dry finned tube exchanger for controlling flow of air therethrough in the same manner as the dampers shown in FIG. 15.

An alternate location for damper structure 366 is illustrated in FIG. 16 wherein the damper blades 368 under the control of mechanism 370 are located inside of the plenum chamber 360 of tower casing 332 in disposition proximal to the inner face of dry heat exchange structure 342 for blocking flow of air therethrough. Positioning of the damper structure 366 against the outer face of heat exchange structure 342, or in the alternative, proximal to the inner face of the dry heat exchange unit, is primarily a matter of choice. Dampers located outside of the cooling tower can encounter operational problems attributable to freezing of the linkage or the blades of the damper system during periods of the year when precipitation deposits can undergo thawing and refreezing, unless suitable precautions are taken to avoid such freeze-up. Since the materials used in an outside environment are generally less expensive than those required for a damper which is located within the plenum chamber 360 of tower casing 332, it is frequently desirable to employ the outside dampers if at all possible so long as there is no significant problem of damper freeze-up. However, when the damper structure 366 is located within the tower as illustrated in FIG. 16, the materials chosen for fabrication of the dampers must be selected so that undesirable corrosion of the parts is avoided. It can be appreciated that the warm moist atmosphere inside of the cooling tower 330 can very rapidly affect the components of damper structure 366 in an adverse manner unless the parts thereof are constructed of materials which resist corrosion in the normal atmosphere existing within the tower.

Figures 17, 18:
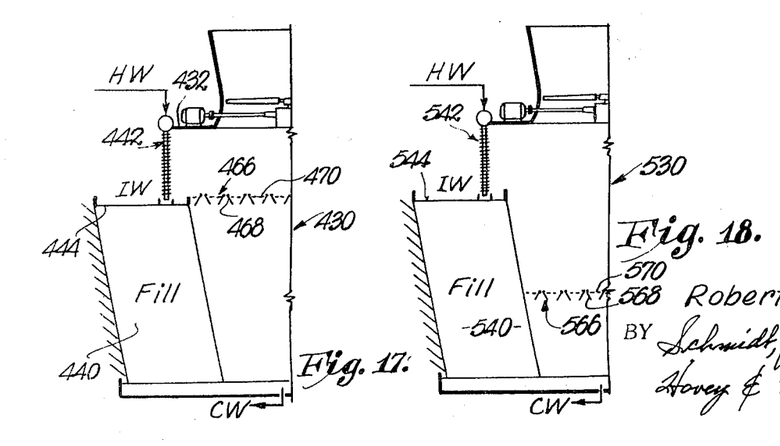
FIG. 17 is a diagrammatic showing of the cooling tower illustrated in FIGS. 14–16 and schematically illustrating another position for the air control dampers which, in this case, are located inside of the tower casing to control flow of air through the wet fill assembly underlying the dry finned tube heat exchange structure.
FIG. 18 is another schematic showing of dampers for controlling flow of air through the wet fill section of the tower illustrated in FIGS. 14–17 and in this instance, illustrating the way in which the dampers may be located intermediate the vertical dimensions of the evaporative heat exchange section of the tower.

Thus, the dampers 366 as illustrated in FIGS. 15 and 16 have primary utility for shutting off all air passing through the dry heat exchange structure 342 during periods of high dry-bulb and low wet-bulb temperatures. However, dampers may be used for other purposes in the cooling tower apparatus of this invention. FIGS. 14, 17 and 18 illustrate damper systems which can be used in conjunction with damper structure 366 or as a separate damper capability to increase the plume abatement properties of the cooling tower during periods of extremely low ambient temperature conditions and coincident high heat loads. For example, in FIG. 17, damper structure 466 is shown in horizontal disposition spanning the distance between hot water distribution basins 444 of a cooling tower 430 similar to towers 30 and 330. The horizontal damper blades 468 simultaneously movable under the control of a common operating mechanism 470 are shiftable from the open positions of the same as illustrated in FIG. 17, to closed disposition blocking flow of air through the lower part of the tower casing 432 to thereby interrupt flow of air from the ambient atmosphere through the wet fill structure 440. However, it can be seen that damper structure 466 in the closed position thereof, does not interfere with free flow of ambient air through the dry finned tube heat exchange structure 442 overlying intermediate water distribution basin 444.

Upon closing damper structure 468, airflow into opposed inlets of tower casing 432 is interrupted to thereby substantially increase the velocity of the airflow through opposed dry finned tube heat exchange sections 442. Alternatively, the damper blades 468 may be moved to partially closed positions for throttling the airflow through opposed fills 440 to lower the heat transfer effect thereof while increasing the heat exchange carried out in dry heat exchangers 442 attributable to the increased airflow therethrough. The plume abatement capability of tower 430 is increased as the amount of air through dry exchanger sections 442 is increased with respect to airflow through wet fill sections 440. By virtue of the infinite adjustment of damper blades 468 between the open and closed positions thereof, the most desirable airflow relationship through heat exchanger structures 442 and 440 may be established for a particular ambient temperature condition where the heat load remains high regardless as the ambient air temperature around the tower varies.

An alternate arrangement for throttling or blocking airflow through the wet sections of tower 430 is illustrated in FIG. 14 where the outer inlet louvers 452 are mounted for pivoting movement about their longitudinal axes and movable simultaneously through the medium of suitable connecting linkage 470 under the control of an operator motor 472. In this instance, the louvers 452 serve the dual function of containing water within respective fill structures 440 and at the same time allow selective control over the inflow of air to the tower casing 432 for flow through the wet fill 440.

A third location for adjustable dampers capable of throttling airflow through the evaporative heat exchange section of a cooling tower is illustrated in FIG. 18 wherein it can be seen that damper structure 566 provided on tower 530 is located in a horizontal plane intermediate the vertical height of wet fill assemblies 540. Horizontal damper blades 568 are under the control of a common operating mechanism 570 which permits closing of the damper blades 568 to shut off nearly all air to the lower portion of respective evaporative heat exchange structures 540. Closing of the damper structure 566 has the effect of increasing airflow velocity in the remaining upper portion of each fill 540 as well as through the dry finned tube heat exchange structures 542 overlying the basin 544 of each fill 540. Damper structure 566 is located in disposition such that the air velocity through each set fill 540 does not produce excessive drift of water droplets entrained in the air emanating from the fill structures. The damper arrangement illustrated in FIG. 18 permits selective increase of the air velocity through the finned tube heat exchange structure 542 to increase the heat transfer capacity of that component. At the same time, the closed dampers 566 increase the air velocity through the wet heat exchangers 540 to reduce the wet bulb out temperature of the air emanating therefrom. This reduction in wet bulb out temperature of the moist air leaving heat exchange structures 540 reduces the degree of difficulty of the fog abatement problem. The total mass flow proportion of air which flows through the wet sections 540 is also reduced compared to the total mass flow of air through the dry heat exchangers 542 in comparison to the original proportions established for the system with the damper structure 566 in an open condition. In lieu of damper structure 566, a manually removable panel may be used seasonally and placed in partial overlying relationship to the outer face of fill 540 on each side of the tower 530 to restrict inflow of air to the wet heat exchange structure. The selectively controllable damper blades 568 are preferred though for more precise control over the operation of the tower and optional increase or decrease of airflow through heat exchange structures 542 and 540.

Figure 19:
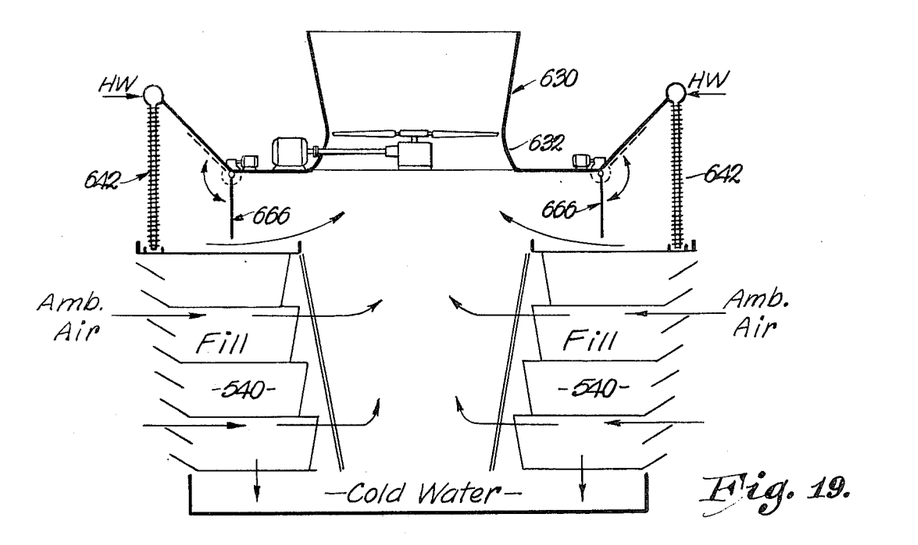
FIG. 19 is a schematic cross-sectional representation of an induced draft, crossflow, parallel air path wet-dry water cooling tower wherein an airflow control damper is mounted inside of the tower behind each finned tube heat exchange section in disposition to selectively limit airflow therethrough without completely blocking such airflow at any of the operating positions of a respective damper.

A preferred and somewhat simpler damper control usable in lieu of the damper structure 366 illustrated in FIGS. 15 and 16 is shown in FIG. 19 wherein single blade dampers 666 are mounted inside of the casing 632 of cooling tower 630 in sufficient spaced relationship from the inner faces of corresponding dry finned tube heat exchange structures 642 to permit the damper blades 666 to be moved from respective throttling, vertically oriented positions thereof as illustrated in FIG. 19, to the fully open position indicated by dotted lines in such figure. The single dampers 666 in the closed disposition of the same leave an opening of about 5% to 10% of the face area of finned tube heat exchange sections 642 so that air is not completely blocked even when the dampers are closed. Dampers 666 are shifted to the open, dotted line positions of the same in cold weather for maximum visible plume abatement. During warmer months, the dampers are shifted to their vertical positions as illustrated in FIGS. 19 to increase the effectiveness of evaporative heat exchange structures 640 by virtue of the increased airflow through these sections caused by throttling of the air through dry heat exchangers 642. At lower airflow rates, the dry finned tube heat exchange structures 642 retain a relatively large proportion of their heat transfer capability and develop a high plenum entering velocity of air and consequent adequate summer visible plume abatement, while the increase in cooling capability of evaporative heat exchange sections 640 is essentially directly proportional to the rate of airflow therethrough and thus increases as the airflow is increased.

A parallel air path wet-dry water cooling tower of preferred characteristics constructed in accordance with this invention is also provided with either variable pitch fan blades, variable speed or multiple speed fan motors, or means for shutting down both the air and water flow to adjacent fan cells when reduction in capacity is required, so that freeze-up of the tower during light loads and very cold weather conditions can be avoided. This adjustment capacity also insures an adequate flow of hot water and proportional airflow through the dry and wet sections of the tower to prevent formation of a visible plume above the tower, even when the load thereon decreases or air moved through the exchanger sections of the tower decreases for any reason.

Figure 13:
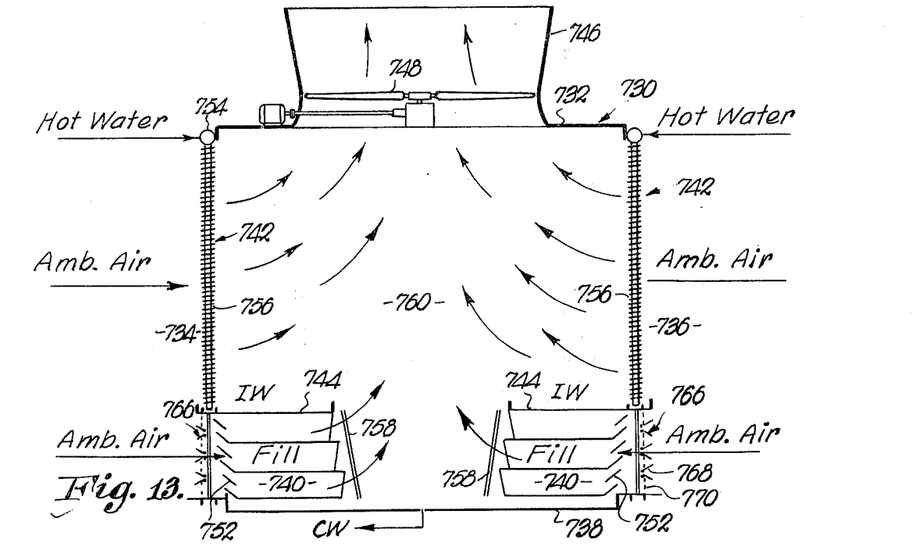
FIG. 13 is a schematic showing of an induced draft, crossflow type parallel air path wet-dry cooling tower embodying another form of the present invention wherein makeup water requirements of the tower are substantially less than the towers of FIGS. 1–12 inclusive by virtue of the provision of a finned tube heat exchange unit of substantially greater size than the evaporative heat exchange section of the tower whereby the wet fill assembly serves as a trimmer or helper for the dry heat exchange section of the cooling tower.

The cooling tower 730 illustrated in FIG. 13 of the drawings represents another form of the invention wherein an evaporative heat exchanger section is used as a helper for much larger dry finned tube heat exchange structures of substantially larger overall capacity to increase the cooling capability of the tower without requiring large volumes of water makeup. As is apparent from the showing in FIG. 13, casing 732 has inlet openings 734 and 736 at opposite sides thereof with the finned tube heat exchange structures 742 in each air inlet being of significantly greater size and capacity than the evaporative heat exchange structures 740 located in underlying relationship thereto. It is to be appreciated though that the heat exchange structures 740 and 742 are the same as the wet and dry heat exchangers of the towers shown in FIGS. 1–3 except for their relative sizes. As a consequence, hot water delivered to the header 754 of each heat exchange section 742 is distributed throughout the length of the header for gravitation through corresponding finned tubes 756. The partially cooled intermediate water discharged from the lower ends of tubes 756 is received within corresponding hot water distribution basins 744 overlying the fill of respective wet heat exchange structures 740. Cold water basin 738 underlying casing 732 receives the cooled water from fills 740 thus providing a reservoir of cold water for return to the point of use thereof. Fan 748 within fan cylinder 746 at the top of casing 732 pulls air in through heat exchange structures 740 and 742 respectively along separate paths indicated by the arrows in FIG. 13. Optionally, selectively movable dampers 766 are provided in overlying relationship to the outer face of each of the evaporative heat exchange structures 740 to control flow of air through the latter. The fixed inlet louvers 752 located inboard of adjustable damper structure 766 or optionally adjustable inlet louvers at each side of tower casing 732 contain splash and water in corresponding fill assembly 740 to preclude significant loss of water through the air inlets of the casing. Water droplets entrained in the air emanating from fill structures 740 is removed from respective moist airstreams by eliminators 758 proximal to the inner inclined faces of fill structures 740. The moist air passing out of the eliminators 758 and which moves upwardly for discharge from the casing 732 through fan cylinder 746, is comingled with dry air entering the tower casing through heat exchange structures 742. Mixing of the wet and dry airstreams takes place in plenum chamber 760 so that the relative humidity of the comingled airstreams emanating from heat exchange structures 740 and 742 respectively, is maintained below the saturation curve 62.

Although the dampers 766 made up of a series of simultaneously movable blades 768 under the control of common operating mechanism 770 have been shown as located outside of tower casing 732, it is to be understood that such louvers may be located inside of the tower proximal to eliminator 758 or as a horizontal line of louvers extending between proximal edges of intermediate water distribution basins 744. The damper blades 766 may be oriented vertically if desired rather than in horizontal disposition as shown to maximize controllability thereof. This arrangement would make it easier to transport power to the damper blades to insure proper synchronization of the complete damper system. In addition, the possibility of damper linkage spring-back would be minimized to insure against inability to completely close the damper blades attributable thereto.

When tower 730 is operating in cold or mild weather, the dampers 766 may be closed to block or severely limit flow of air through respective wet heat exchange sections 740 thus causing ambient air to flow only through the dry heat exchange structures 742. As a result, there is very little if any makeup of water to the system required since the cooling tower is preferably sized so that the dry finned tube heat exchange sections thereof are adequate to cool the hot water delivered to the tower except under the most severe summer conditions encountered where high dry-bulb temperatures are coincident with low wet-bulb temperature values. Tower 730 is therefore adapted to be used if desired in areas where makeup water supplies are limited and it would be impossible or prohibitively expensive to provide sufficient makeup water for a completely wet, evaporative heat exchange water cooling tower.

In summer months when the dry-bulb temperature rises coincident with decrease of the wet-bulb temperature, the damper blades 768 may be opened fully or as required to minimize water consumption to allow air from the ambient atmosphere to flow through fill structures 740 along a path parallel with flow of air through the dry heat exchange sections 742. As a result, the cooling capacity of the tower is significantly increased by virtue of the addition of the cooling capacity of the wet fill sections 740. Although some water makeup is required during operation of tower 730 with inlet dampers 766 open, such makeup is limited not only from the standpoint of the short time duration of operation of the tower with the dampers open, but also because the size of fill sections 740 is necessarily relatively small in comparison with the design capacity of the tower in view of the fact that major cooling of the hot water is intended to be handled at all times by the dry finned tube heat exchange structures 742.

In a completely dry water cooling tower, the practical approach limit of the ambient air dry-bulb temperature to that of the water to be cooled is about 25° to 50° F., whereas in an evaporative type cooling tower, the practical approach can be from 12° to 20° wet-bulb. As a consequence, an evaporative type cooling tower is more efficient for most applications with water makeup being the only significant problem aside from the cost and maintenance of the tower. The addition of evaporative heat exchange structures 740 to tower 730 permits operation thereof under most circumstances without evaporative cooling being required as an adjunct to the overall cooling process, but with the capability of immediately and selectively adding the wet cooling sections as a part of the system upon demand and as needed to handle high dry-bulb and low wet-bulb ambient temperature conditions.

The wet heat exchange structures 740 thus act as helpers for the dry coil sections thereof to permit trimming of the size of the finned tube structures over what would otherwise be required for a particular application. As a result, a cooling tower of the type illustrated in FIG. 13 may be used in instances where a completely dry finned tube water cooling tower would be completely impractical from a cost standpoint. This is for the reason that if the dry tower is sized so as to handle the load thereon at the highest dry-bulb and lowest wet-bulb temperature condition likely to be encountered at that particular geographical location, the size and therefore the cost of the tower would in most instances be prohibitively expensive as compared with other ways of cooling the water. However, by including the small trimmer structures 740 as a part of the overall tower, the size and therefore capacity of dry heat exchange sections 742 may be significantly reduced while still maintaining the tower within design specifications. In many cases, the overall cost of the tower is thereby brought into practical economic limits.

Having thus described the invention, what is claimed as new and desired to be secured by Letters Patent is:

1. In a water cooling tower, the combination of:
    means for moving ambient air from the atmosphere along two separate, spaced paths of travel;

first heat exchange structure comprising a series of finned tubes adapted to receive hot water to be cooled and located in a pattern to bring such hot water into indirect heat exchange with an ambient derived airstream moving along one of said paths of travel thereof past the finned tubes to partially cool the water;

second heat exchange structure below said first heat exchange structure and including a horizontal water distribution basin located to receive partially cooled water from the finned tubes, and a fill assembly below said basin for receiving water therefrom to bring the partially cooled water into direct, evaporative heat exchange relationship with an ambient derived airstream moving along the other of said paths of travel through the fill assembly to further cool the water, said finned tubes being arranged in disposition causing the lower ends thereof to be submerged in partially cooled water which collects in the water distribution basin; and means for bringing the separate airstreams emerging from said first and second heat exchange structures into combined relationship before return thereof as a common stream to the ambient atmosphere.

2. A cooling tower as set forth in claim 1, wherein said basin is provided with weir defining members for confining water therebetween at a level to assure submersion of the finned tube ends in water directed to the basin for collection therein prior to gravitation onto the fill assembly therebelow.

* * * * *